United States Patent [19]

Cuevas

[11] Patent Number: 5,364,127

[45] Date of Patent: Nov. 15, 1994

[54] INFLATOR ASSEMBLY

[75] Inventor: Jess A. Cuevas, Scottsdale, Ariz.

[73] Assignee: TRW Inc., Lyndhurst, Ohio

[21] Appl. No.: 76,112

[22] Filed: Jun. 11, 1993

[51] Int. Cl.$^5$ ............................................. B60R 21/28
[52] U.S. Cl. .................... 280/741; 280/740; 222/3; 102/530
[58] Field of Search .............. 280/737, 741 R, 740, 280/736 R; 222/3; 102/530, 531; 422/164, 165, 166

[56] References Cited

U.S. PATENT DOCUMENTS

| | | | |
|---|---|---|---|
| 3,806,153 | 4/1974 | Johnson | 280/741 |
| 3,836,170 | 9/1974 | Grosch et al. | 280/741 |
| 3,868,124 | 2/1975 | Johnson | 280/740 |
| 3,895,821 | 7/1975 | Schotthoefer et al. | 280/740 |
| 5,131,680 | 7/1992 | Coultas et al. | 280/737 |
| 5,184,846 | 2/1993 | Goetz | 280/740 |

Primary Examiner—Kenneth R. Rice
Assistant Examiner—Christopher P. Ellis
Attorney, Agent, or Firm—Tarolli, Sundheim & Covell

[57] ABSTRACT

An apparatus (10) for inflating an air bag (12) includes a pressure vessel (14), a diffuser (180) and an ignitable material (80). The pressure vessel (14) defines a sealed chamber (18) which is filled with inflation fluid that is not ignitable within the chamber (18). The diffuser (180) directs the inflation fluid from the pressure vessel (14) to the air bag (12). The ignitable material (80) is ignited and emits combustion products in response to an actuating signal. The apparatus (10) further includes a canister (70) for dispersing the combustion products in the inflation fluid within the chamber (18). The canister (70) contains the ignitable material (80) and is moved within the chamber (18) when the ignitable material (80) is burning.

13 Claims, 3 Drawing Sheets

INFLATOR ASSEMBLY

FIELD OF THE INVENTION

The present invention relates to an apparatus for inflating an inflatable device such as an air bag which restrains an occupant of a vehicle.

BACKGROUND OF THE INVENTION

An apparatus for inflating an inflatable vehicle occupant restraint, such as an air bag, is disclosed in U.S. Pat. No. 5,131,680. The apparatus disclosed in the '680 patent includes a container which stores gas for inflating the vehicle occupant restraint. The apparatus further includes a body of pyrotechnic material and an igniter assembly for igniting the body of pyrotechnic material. The igniter assembly includes an ignition material which rapidly burns at a relatively high temperature to generate heat and flame. The heat and flame generated by the ignition material ignite the body of pyrotechnic material. As the body of pyrotechnic material burns, hot combustion products emitted by the body of pyrotechnic material pressurize and supplement the stored gas.

The apparatus disclosed in the '680 patent also includes an actuator assembly which operates in response to vehicle deceleration indicative of a collision. The actuator assembly thus operates to actuate the igniter assembly, and also to rupture a burst disk to release a flow of gas from the container. The actuator assembly includes an ignition material which, when ignited, generates pressure against the head of a piston to move the piston. The moving piston ruptures the burst disk and strikes the igniter assembly to ignite the ignition material in the igniter assembly. The ignition material in the igniter assembly then ignites the body of pyrotechnic material within the container.

SUMMARY OF THE INVENTION

In accordance with the present invention, an apparatus for inflating an inflatable device comprises a pressure vessel means, a diffuser means and an ignitable means. The pressure vessel means defines a sealed chamber. The sealed chamber is filled with inflation fluid that is not ignitable within the chamber. The diffuser means directs the inflation fluid from the chamber into the inflatable device. The ignitable means increases the temperature and pressure of the inflation fluid within the chamber. The ignitable means includes an ignitable material which, when ignited, produces combustion products including heat for heating and pressurizing the inflation fluid.

The apparatus further includes a means for igniting the ignitable material in response to an actuating signal, and a dispersing means for dispersing the combustion products in the inflation fluid within the chamber. The dispersing means moves the ignitable material within the chamber when the ignitable material is burning.

An apparatus constructed in accordance with the present invention inflates an inflatable device, such as an air bag which restrains a vehicle occupant, fully and rapidly. The ignitable material rapidly increases the temperature and pressure of the inflation fluid within the chamber because the dispersing means moves the ignitable material within the chamber when the ignitable material is burning. The products of combustion emitted by the ignitable material are thus dispersed throughout the inflation fluid within the chamber so as to heat and pressurize the inflation fluid substantially uniformly and rapidly throughout the chamber. The inflation fluid is thus pressurized sufficiently to inflate the inflatable device fully and rapidly.

BRIEF DESCRIPTION OF THE DRAWINGS

The foregoing and other features of the present invention will become apparent to those skilled in the art to which the present-invention relates from reading the following description with reference to the accompanying drawings, in which.

DESCRIPTION OF PREFERRED EMBODIMENTS

Figure 1:
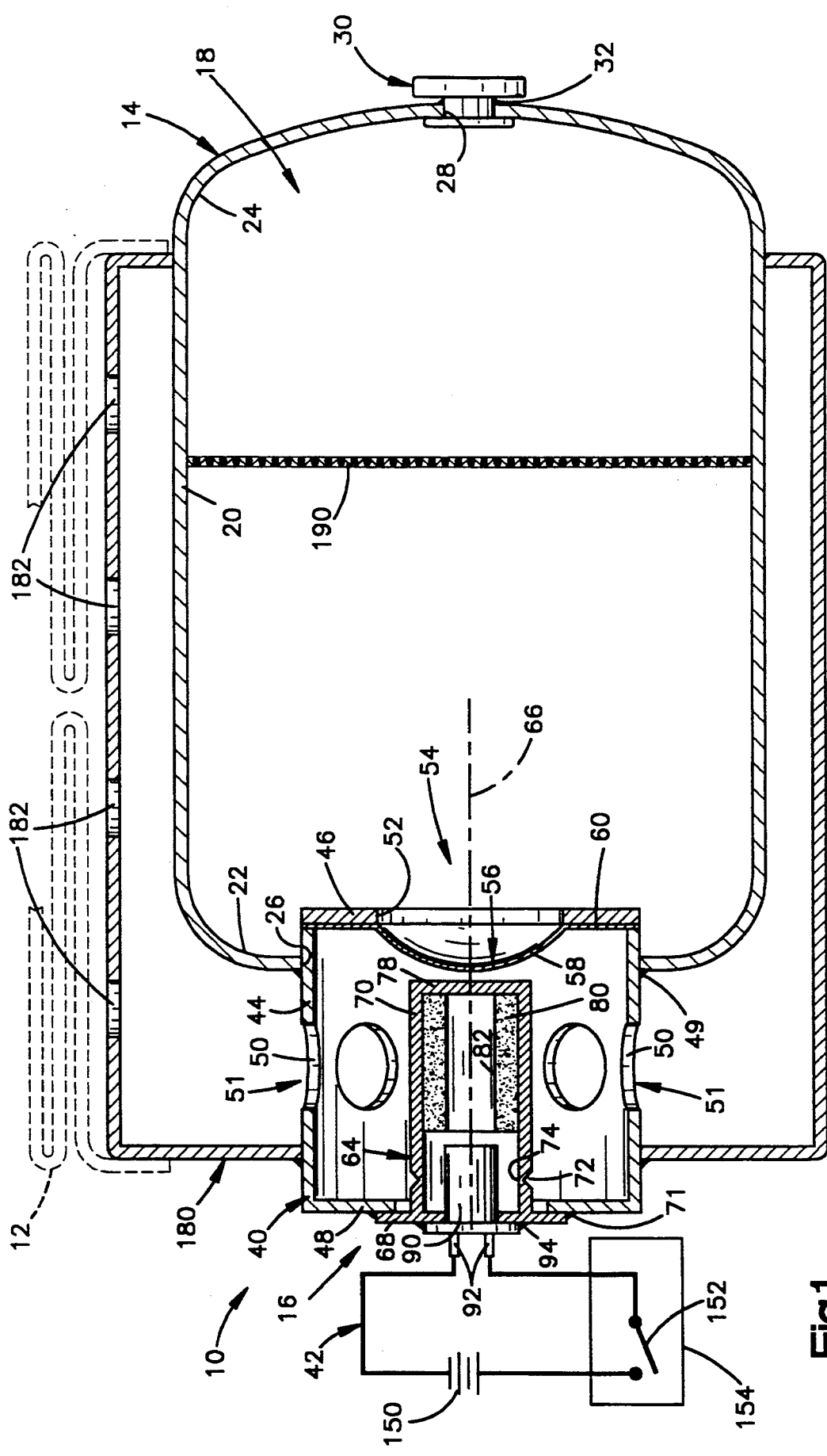
FIG. 1 is a schematic view of a vehicle occupant restraint apparatus which is a first embodiment of the present invention.
Figure 2:
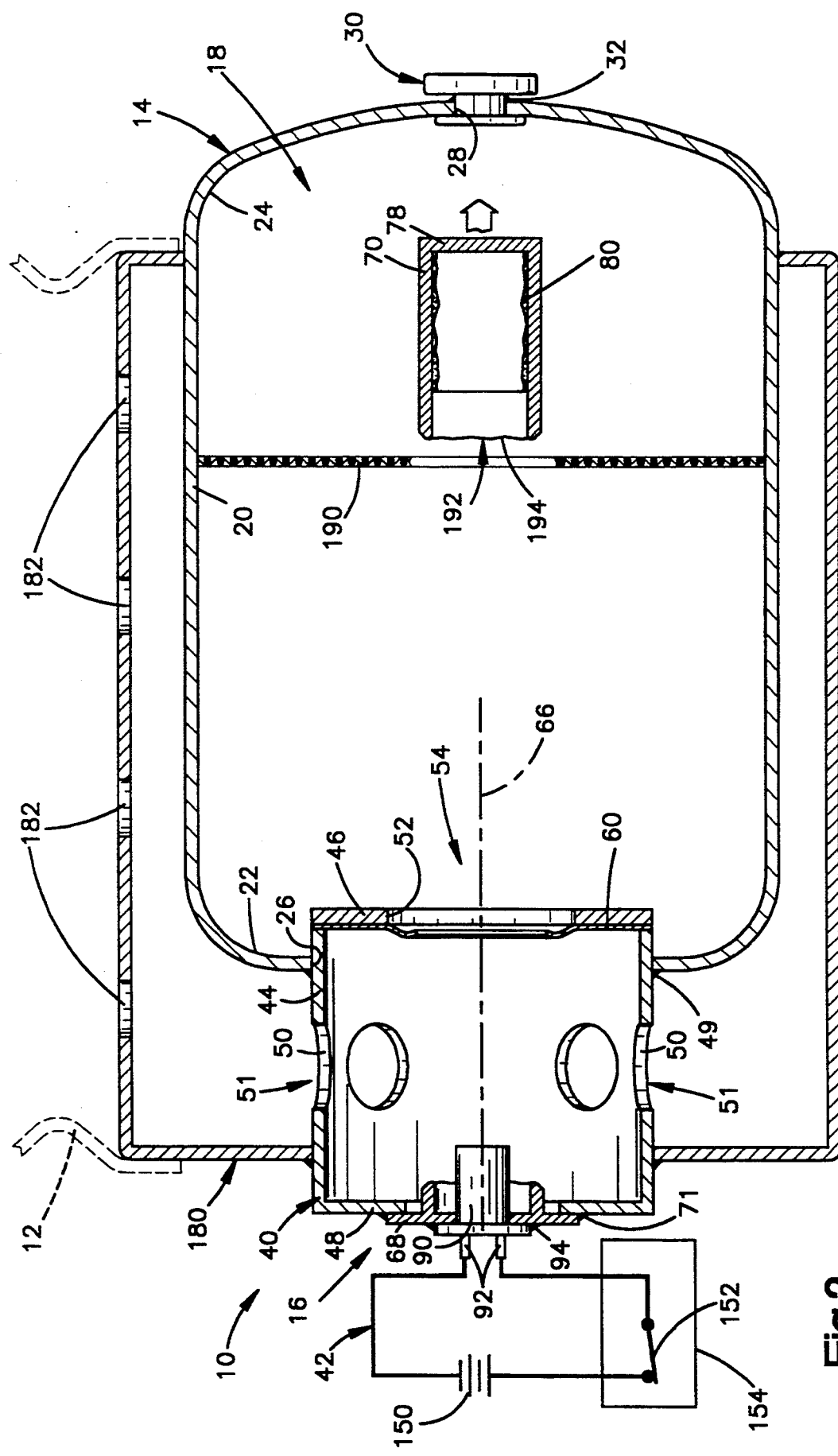
FIG. 2 is a view of the apparatus of FIG. 1 in an actuated condition.

As shown schematically in FIGS. 1 and 2, a first embodiment of the present invention is a vehicle occupant restraint apparatus 10. The apparatus 10 includes an inflatable vehicle occupant restraint 12, which is commonly referred to as an air bag. The apparatus 10 has an unactuated condition in which the air bag 12 is stored in a folded condition, as indicated in FIG. 1, and has an actuated condition in which the air bag 12 is inflated, as indicated in FIG. 2. The apparatus 10 is actuated in response to vehicle deceleration indicative of a collision. The air bag 12 is then inflated from the stored, folded condition to the inflated condition in which it restrains movement of a vehicle occupant and protects the vehicle occupant from forcibly striking parts of the vehicle.

The apparatus 10 further includes a pressure vessel 14. The pressure vessel 14 includes a tank 15 and an actuator assembly 16. The tank 15 and the actuator assembly 16 together define a sealed chamber 18 containing an inflation fluid for inflating the air bag 12. In the preferred embodiments of the invention shown in the drawings, the inflation fluid consists essentially of an inert gas or a mixture of inert gases. The actuator assembly 16 operates to release the gas from the chamber 18 upon the occurrence of vehicle deceleration indicative of a collision.

The tank 15 has a cylindrical side wall portion 20, a first end wall portion 22 and a second end wall portion 24. The first end wall portion 22 of the tank 15 has an annular inner edge surface 26 defining an opening extending through the first end wall portion 22. The second end wall portion 24 of the tank 15 has an annular inner edge surface 28 which similarly defines an opening extending through the second end wall portion 24.

An end cap 30 is closely received through the opening in the second end wall portion 24 of the tank 15. A weld 32 blocks leakage of the gas from the chamber 18 between the edge surface 28 and the end cap 30. The end cap 30 has a passage (not shown) through which the gas is conducted into the chamber 18. When the chamber 18 has been filled with gas at a desired pressure, the passage in the end cap 30 is closed. The end cap 30 may also include a conventional pressure switch which monitors the gas pressure in the chamber 18 to alert an occupant of the vehicle if the gas pressure drops below a predetermined level.

As noted above, the inflation fluid in the chamber 18 may comprise a single gas or a mixture of gases. However, in any case the inflation fluid is not ignitable within the chamber 18. More specifically, the inflation fluid in the chamber 18, which is preferably a gas or a mixture of gases, is essentially free of components that would be ignitable and combustible within the chamber 18. The compositions of such gases and mixtures of gases which are suitable for inflating the air bag 12 are known in the art. For example, argon is known as a preferred gas for inflating an air bag. The chamber 18 is thus filled with argon in the preferred embodiment of the present invention.

The actuator assembly 16 includes a manifold 40 and an electrical circuit 42. The manifold 40 has a cylindrical side wall 44, a first end wall 46 and a second end wall 48. The cylindrical side wall 44 of the manifold 40 is closely received through the opening in the first end wall portion 22 of the pressure vessel 14. A weld 49 blocks leakage of the gas from the storage chamber 18 between the edge surface 26 and the cylindrical side wall 44.

The cylindrical side wall 44 of the manifold 40 further has a plurality of annular inner edge surfaces 50 defining a circumferentially extending array of gas flow openings 51. The first end wall 46 of the manifold 40 has an annular inner edge surface 52 defining a circular gas exit opening 54. The gas exit opening 54 is closed by a metal burst disk 56. The burst disk 56 has a bulged central portion 58 and a flat annular rim portion 60. The central portion 58 extends over the gas exit opening 54. The rim portion 60 is welded between the cylindrical side wall 44 and the first end wall 46 of the manifold 40. The burst disk 56 is thus supported in the manifold 40 between the gas exit opening 54 and the gas flow openings 50, and blocks the gas from flowing outward from the chamber 18 through the gas exit opening 54.

An actuator housing 64 also is supported in the manifold 40. The actuator housing 64 is a tubular member with a longitudinal central axis 66, a circular base portion 68, and a cylindrical canister portion 70. The actuator housing 64 extends into the manifold 40 through an opening in the second end wall 48 of the manifold 40, and is fixed to the manifold 40 by a weld 71 between the base portion 68 of the actuator housing 64 and the second end wall 48 of the manifold 40. A notch 72 extends circumferentially around the actuator housing 64 between the base portion 68 and the canister portion 70. The notch 72 weakens the actuator housing 64, and thus defines a rupturable peripheral portion 74 of the actuator housing 64 between the base portion 68 and the canister portion 70. The rupturable peripheral portion 74 of the actuator housing 64 could alternatively be formed by a peripheral score line, a thinned peripheral wall portion, or the like.

The canister portion 70 of the actuator housing 64 has an end wall 78 adjacent to the burst disk 56, and contains an ignitable propellant material 80. The ignitable propellant material 80 is preferably BKNO3, and is preferably shaped as a tube which is closely fitted within the canister portion 70 of the actuator housing 64, as shown in FIG. 1. The ignitable propellant material 80 thus has a cylindrical inner surface 82 extending along the axis 66 within the canister portion 70 of the actuator housing 64.

An igniter 90 extends through an opening in the base portion 68 of the actuator housing 64 and into the canister portion 70. The igniter 90 is of known construction, and emits products of combustion when actuated upon the passage of electric current between a pair of electrically conductive pins 92 in the igniter 90. The igniter 90 is fixed to the base portion 68, such as by a weld 94, and is thus supported by the actuator housing 64 in a position to direct its products of combustion into the canister portion 70.

The electrical circuit 42 includes a power source 150, which is preferably the vehicle battery, and a normally open switch 152. The switch 152 is preferably part of a vehicle deceleration sensor 154. The deceleration sensor 154 senses vehicle deceleration which is indicative of a collision, and closes the switch 152 in response to such vehicle deceleration. Such a deceleration sensor is known in the art. The electrical circuit 42 extends through the igniter 90 between the pins 92.

When the vehicle experiences a collision, the deceleration sensor 154 senses the deceleration of the vehicle that is caused by the collision and closes the switch 152. When the switch 152 is closed, electric current passes through the igniter 90 between the pins 92. The igniter 90 is then actuated and emits products of combustion which move into the canister portion 70 of the actuator housing 64. The products of combustion emitted by the igniter 90 move against the cylindrical inner surface 82 of the tubular body of ignitable propellant material 80 to ignite the tubular body of ignitable propellant material 80 uniformly along its length. The ignitable propellant material 80 then burns and emits products of combustion, including heat, flame, hot particles and hot gas, in the canister portion 70 of the actuator housing 64.

The combustion products emitted by the ignitable propellant material 80 are initially contained within the actuator housing 64. The gaseous components of the combustion products and the air within the actuator housing 64 increase in pressure as the ignitable propellant material 80 burns. The increasing gas pressure in the actuator housing 64 acts axially against the end wall 78 and radially against the rupturable peripheral portion 74. When the increasing gas pressure reaches a predetermined elevated level, the force of the gas pressure becomes great enough to rupture the rupturable peripheral portion 74. The rupturable peripheral portion 74 could alternatively be designed to rupture under the influence of the heat or a combination of the heat and gas pressure which result from combustion of the ignitable material 80. When the rupturable peripheral portion 74 is thus ruptured, the force of the gas pressure acting axially against the end wall 78 acts as a thrust which moves the canister portion 70 axially away from the base portion 68 and toward the burst disk 56.

The canister portion 70 of the actuator housing 64 is moved against the burst disk 56 forcefully enough to rupture the burst disk 56, as shown in FIG. 2. The canister portion 70 thus opens the pressure vessel 14 to release the gas from the chamber 18. The gas then begins to flow outward through the gas exit opening 54 and through the manifold 40 to the gas flow openings 51. A diffuser 180 with a plurality of gas flow openings 182 directs the gas to flow from the manifold 40 into the air bag 12.

Additionally, the canister portion 70 is moved forcefully enough to continue moving through the burst disk 56 and into the chamber 18 as shown in FIG. 2. An optional screen 190 may be included within the chamber 18 to capture the canister portion 70 at the end of the chamber 18 remote from the gas exit opening 54 after the canister portion 70 breaks through the screen 190. The canister portion 70 thus carries the ignitable propellant material 80 into the gas in the chamber 18 when the ignitable propellant material 80 is burning. Moreover, the canister portion 70 then has a rearwardly facing opening 192 which is defined by the edge 194 of the ruptured peripheral portion 74. The combustion products emitted by the ignitable propellant material 80, including heat, flame, hot particles and hot gas, emerge from the opening 192 as the canister portion 70 moves through the gas in the chamber 18. The combustion products are thus dispersed in the gas sufficiently to heat and further pressurize the gas substantially uniformly and rapidly throughout the chamber 18. The combustion products will heat and further pressurize the gas within the chamber 18 but will not ignite the gas because, as noted above, the gas is not ignitable within the chamber 18. The further pressurized gas inflates the air bag 12 fully and rapidly.

Figure 3:
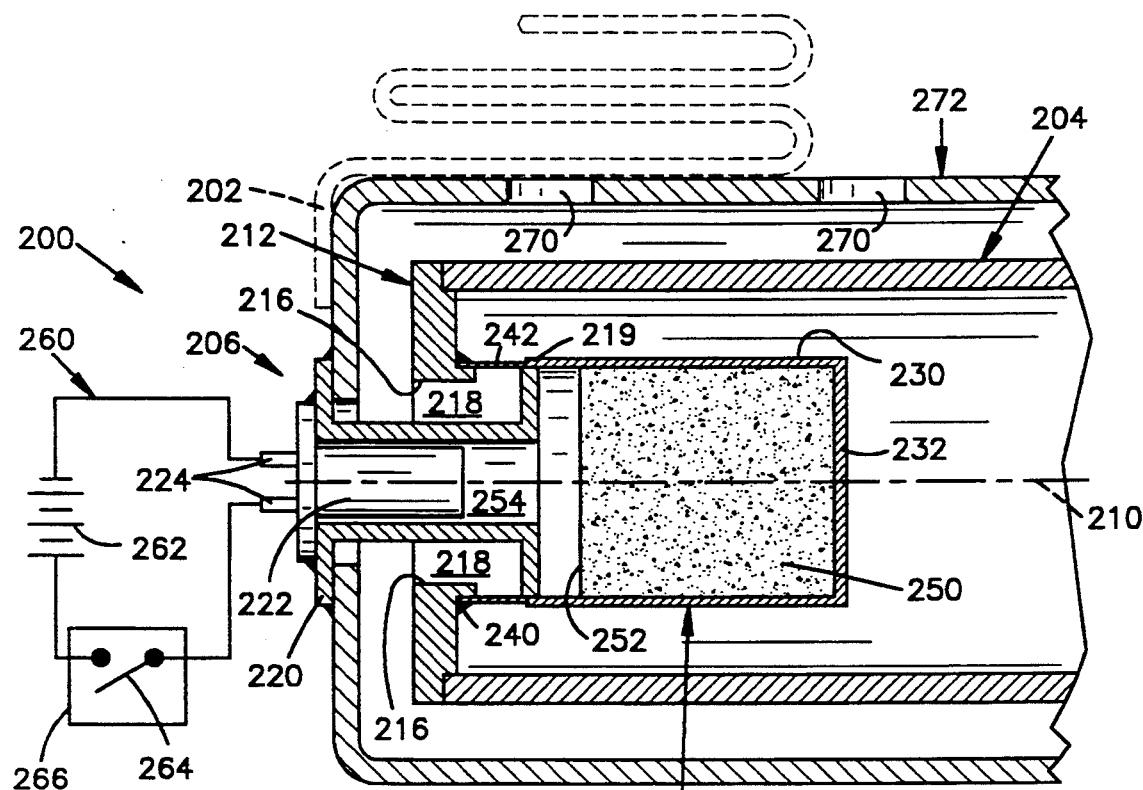
FIG. 3 is a schematic view of a vehicle occupant restraint apparatus which is a second embodiment of the present invention.
Figure 4:
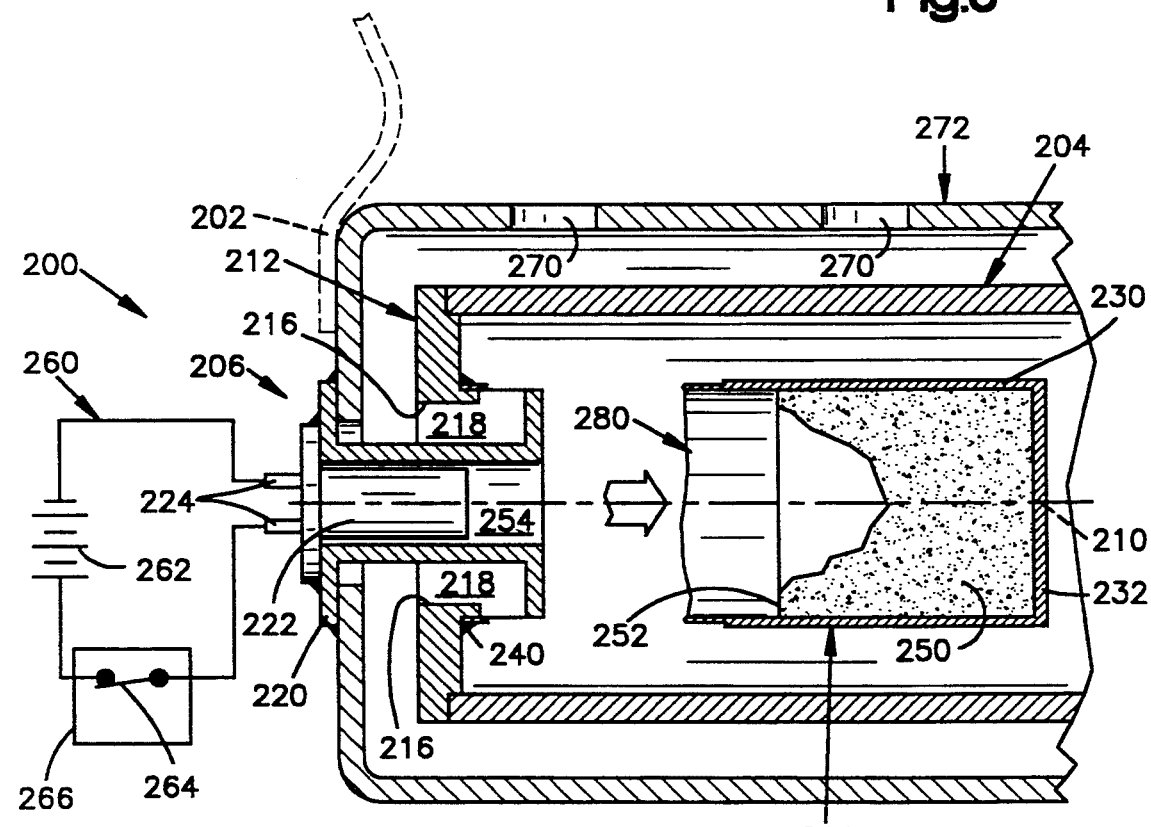
FIG. 4 is a view of the apparatus of FIG. 3 in an actuated condition.

As shown schematically in FIGS. 3 and 4, a second embodiment of the present invention is a vehicle occupant restraint apparatus 200. Like the apparatus 10 described above, the apparatus 200 includes an air bag 202 which is inflated from a stored, folded condition (FIG. 3) to an inflated condition (FIG. 4) upon actuation of the apparatus 200 in response to vehicle deceleration indicative of a collision.

The apparatus 200 also includes a pressure vessel 204. The pressure vessel 204 includes a tank 205 and an actuator assembly 206. The tank 205 and the actuator assembly 206 together define a sealed chamber 208 which is filled with an inflation fluid for inflating the air bag 202. The actuator assembly 206 operates to release the inflation fluid from the chamber 208 upon the occurrence of vehicle deceleration indicative of a collision. As in the first embodiment of the invention described above, the inflation fluid in the chamber 208 is not ignitable within the chamber 208. Argon is preferred, but the inflation fluid in the chamber 208 may have any suitable composition which is not ignitable within the chamber 208.

The tank 205 has a cylindrical shape centered on a longitudinal axis 210. The end of the tank 205 which is shown in FIGS. 3 and 4 is closed by the actuator assembly 206. The opposite end of the tank 205 is closed by any suitable structure known in the art, such as an end cap like the end cap 30 described above.

The actuator assembly 206 includes a manifold 212 and a canister 214. The manifold 212 has a plurality of inner surfaces 216 which define gas flow passages 218 extending axially through the manifold 212. The axially inner ends of the gas flow passages 218 are open at a cylindrical inner surface 219 of the manifold 212. The manifold 212 also has a central portion 220 which supports an ignitor 222 in a position to direct products of combustion inwardly along the axis 210. The igniter 222 is of known construction and, like the igniter 90 described above, is actuated upon the passage of electric current through the igniter 222 between a pair of electrically conductive pins 224.

The canister 214 has a cylindrical side wall 230 and a circular inner end wall 232 which is perpendicular to, and centered on, the axis 210. The side wall 230 of the canister 214 is closely received over the cylindrical inner surface 219 of the manifold 212. The side wall 230 thus extends over the inner ends of the gas flow passages 218 and blocks the flow of the gas from the chamber 208 into the gas flow passages 218. Leakage of the gas from the chamber 208 between the side wall 230 and the cylindrical inner surface 219 is blocked by a weld 240, or alternatively by any other suitable means for defining a seal. As in the apparatus 10 described above, additional welds and/or other seals are included in the apparatus 200 as needed.

The side wall 230 of the canister 214 further has a relatively thin end portion 242. The end portion 242 extends circumferentially entirely around the axis 210 and directly over the inner ends of the gas flow passages 218. The end portion 242 is weak enough, as compared with the major portion of the side wall 230 shown in FIG. 3, to define a rupturable portion of the canister 214.

An ignitable propellant material 250 is contained within the canister 214. The ignitable propellant material 250 is preferably $BKNO_3$, but other suitable materials known in the art can be used. As shown in FIG. 3, the ignitable propellant material 250 has a surface 252 facing the ignitor 222 across a space 254 which extends axially between the ignitable propellant material 250 and the ignitor 222.

The actuator assembly 206 further includes an electrical circuit 260. The electrical circuit 260 includes a power source 262, which is preferably the vehicle battery, and a normally open switch 264. The switch 264 is preferably part of a vehicle deceleration sensor 266. As known in the art, the deceleration sensor 266 senses vehicle deceleration which is indicative of a collision, and closes the switch 264 in response to such vehicle deceleration. The electrical circuit 260 extends through the igniter 222 between the pins 224.

When the vehicle experiences a collision, the deceleration sensor 266 senses the deceleration of the vehicle that is caused by the collision and closes the switch 264. When the switch 264 is closed, electric current passes through the igniter 222 between the pins 224. The igniter 222 is then actuated and emits products of combustion which move across the space 254 toward the ignitable propellant material 250 in the canister 214. The products of combustion emitted by the igniter 222 thus move against the surface 252 of the ignitable propellant material 250 to ignite the ignitable propellant material 250. The ignitable propellant material 250 then burns and also emits products of combustion into the space 254.

The combustion products emitted by the ignitable propellant material 250 are initially contained within the space 254 in the actuator assembly 206. The gaseous components of the combustion products and the air in the space 254 increase in pressure as the ignitable propellant material 250 burns. The increasing gas pressure in the space 254 acts axially through the ignitable propellant material 250 and against the end wall 232 of the canister 214. The force of the increasing gas pressure is transmitted through the side wall 230 of the canister 214 from the end wall 232 to the rupturable portion 242, and thus acts against the rupturable portion 242 primarily as an axially directed stress. When the increasing gas pressure reaches a predetermined elevated level, the force of the gas pressure becomes great enough to rupture the rupturable portion 242. The force of the gas pressure which continues to act axially against the end wall 232 then acts as a thrust which moves the canister 214 axially away from the manifold 212 and into the chamber 208, as shown in FIG. 4.

When the canister 214 is moved into the chamber 208 as shown in FIG. 4, the rupturable portion 242 of the canister 214 is moved off of the cylindrical inner surface 219 of the manifold 212. The inner ends of the gas flow passages 218 are then uncovered, and the gas in the chamber 208 is released to flow outward through the gas flow passages 218. The gas flows onward to the air bag 202 through a plurality of gas flow openings 270 in a diffuser 272. Additionally, the canister 214 then has a rearwardly facing opening 280 which is defined by the edge 282 of the ruptured portion 242. The combustion products emitted by the ignitable propellant material 250, including heat, flame, hot particles and hot gas, emerge from the opening 280 as the canister 214 moves through the gas in the chamber 208. The combustion products are thus dispersed in the gas sufficiently to heat and further pressurize the gas substantially uniformly and rapidly throughout the chamber 18. The combustion products will heat and further pressurize the gas within the chamber 18 but will not ignite the gas because the gas is essentially free of components that would be ignitable and combustible within the chamber 18. The further pressurized gas inflates the air bag 202 fully and rapidly.

In addition to being further pressurized by the combustion products emerging from the canister 214, the gas in the chamber 208 is also further pressurized by the canister 214 as the end wall 232 moves against the gas and forces the gas to flow around the canister 214 toward the gas flow passages 218. This causes the gas to resist and prevent excessive acceleration of the canister 214 toward the opposite end of the pressure vessel 214. In the preferred embodiment of the invention shown in the drawings the surface area of the end wall 232 facing the gas in the chamber 18 is equal to approximately 75% of the transverse cross-sectional area of the chamber 18. The canister 214 thus has the optimum size for achieving the foregoing effect on the gas in the chamber 208, because a substantially smaller end wall will not compress the gas sufficiently, and a substantially larger end wall will excessively block the flow of the gas around the canister toward the gas flow passages 218.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for inflating an inflatable device, said apparatus comprising:
   pressure vessel means for defining a sealed chamber, said chamber being filled with inflation fluid that is essentially free of components that would be combustible within said chamber;
   means for directing said inflation fluid from said pressure vessel means into the inflatable device;
   ignitable means for increasing the temperature and pressure of said inflation fluid within said chamber, said ignitable means including an ignitable material being contained in a canister which, when ignited, produces combustion products including heat for heating and pressurizing said inflation fluid;
   igniter means for igniting said ignitable material in response to an actuating signal; and
   dispersing means for dispersing said combustion products in said inflation fluid within said chamber, said dispersing means moving said canister containing said ignitable material within said chamber when said ignitable material is burning.

2. Apparatus as defined in claim 1 wherein said dispersing means includes means for causing said combustion products to develop a thrust against said canister to propel said canister through said inflation fluid within said chamber.

3. Apparatus as defined in claim 2 wherein said dispersing means supports said canister at a location outside said chamber.

4. Apparatus as defined in claim 3 wherein said pressure vessel means includes a rupturable vessel wall which is rupturable to define an exit opening through which said inflation fluid flows outward from said chamber, said thrust propelling said canister against said rupturable vessel wall to rupture said rupturable vessel wall.

5. Apparatus as defined in claim 1 wherein said means for directing said inflation fluid from said pressure vessel means into the inflatable device includes a diffuser having a plurality of openings through which said inflation fluid can flow from said pressure vessel means toward the inflatable device.

6. Apparatus as defined in claim 1 wherein the inflatable device is an inflatable vehicle occupant restraint, said apparatus further including means for generating said actuating signal in response to vehicle deceleration.

7. Apparatus for inflating an inflatable device, said apparatus comprising:
   pressure vessel means for defining a sealed chamber, said chamber being filled with inflation fluid that is essentially free of components that would be combustible within said chamber;
   means for directing said inflation fluid from said pressure vessel means into the inflatable device;
   ignitable means for increasing the temperature and pressure of said inflation fluid within said chamber, said ignitable means including an ignitable material which, when ignited, produces combustion products including heat for heating and pressurizing said inflation fluid; and
   igniter means for igniting said ignitable material in response to an actuating signal;
   said pressure vessel means further defining a canister in which said ignitable material is contained, said pressure vessel means further including means for causing said combustion products to develop a thrust against said canister to propel said canister through said inflation fluid within said chamber when said ignitable material is burning.

8. Apparatus as defined in claim 7 wherein said pressure vessel means supports said canister in a first position relative to said chamber, said pressure vessel means having a rupturable portion which, when ruptured, releases said canister for movement from said first position, said pressure vessel means further causing said combustion products to rupture said rupturable portion of said pressure vessel means when said ignitable material is burning.

9. Apparatus as defined in claim 8 wherein said rupturable portion of said pressure vessel means blocks said inflation fluid from flowing outward from said chamber and, when ruptured, releases said inflation fluid to flow outward from said chamber.

10. Apparatus as defined in claim 7 wherein said chamber has a longitudinal axis along which said canister is propelled, said canister occupying approximately 75% of the transverse cross-sectional area of said chamber when said canister is propelled along said axis.

11. Apparatus as defined in claim 10 wherein said transverse cross-sectional area of said chamber is circular, said canister having a planar circular surface perpendicular to said axis, the area of said surface being equal to approximately 75% of said transverse cross-sectional area.

12. Apparatus as defined in claim 7 wherein said means for directing said inflation fluid from said pressure vessel means into the inflatable device includes a diffuser having a plurality of openings through which said inflation fluid can flow from said pressure vessel means toward the inflatable device.

13. Apparatus as defined in claim 7 wherein the inflatable device is an inflatable vehicle occupant restraint, said apparatus further including means for generating said actuating signal in response to vehicle deceleration.

* * * * *